(No Model.)
O. I. SEARLES, G. F. JACKSON & F. M. GUSTIN.
CISTERN CLEANING MACHINE.
No. 433,099. Patented July 29, 1890.
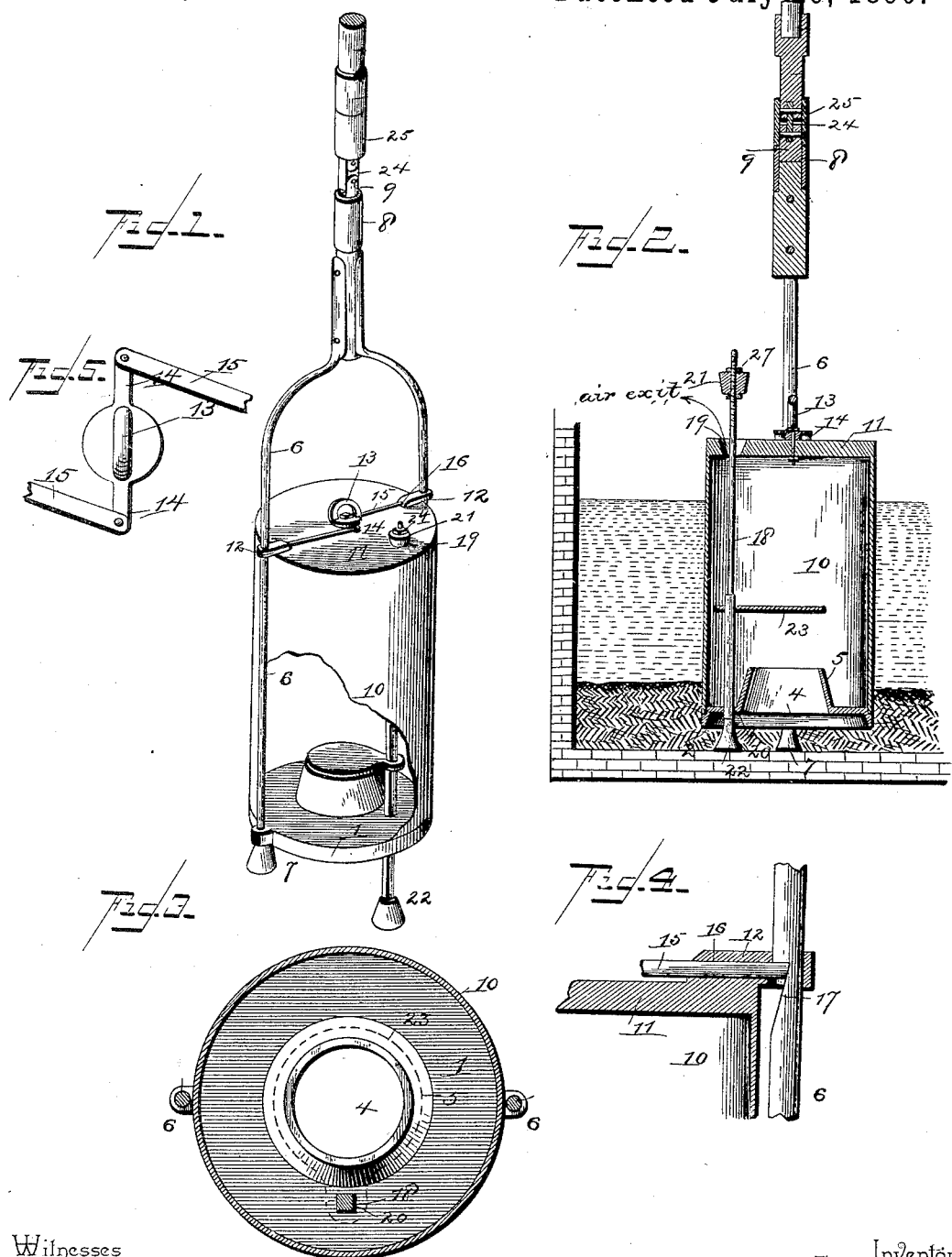
Witnesses
F. L. Ourand
Wm. Bagger
Inventors
O. I. Searles
Geo. F. Jackson
Frank M. Gustin
By their Attorneys,
C. A. Snow & Co.

UNITED STATES PATENT OFFICE.

ORREN I. SEARLES, GEORGE F. JACKSON, AND FRANK M. GUSTIN, OF FORT MADISON, IOWA.

CISTERN-CLEANING MACHINE.

SPECIFICATION forming part of Letters Patent No. 433,099, dated July 29, 1890.

Application filed April 29, 1890. Serial No. 349,919. (No model.)

*To all whom it may concern:*

Be it known that we, ORREN I. SEARLES, GEORGE F. JACKSON, and FRANK M. GUSTIN, citizens of the United States, residing at Fort Madison, in the county of Lee and State of Iowa, have invented a new and useful Cistern-Cleaning Machine, of which the following is a specification.

This invention relates to a device for cleaning cisterns; and it has for its object to provide a device of this class which shall be simple in construction, durable, and efficient in operation.

With these ends in view the invention consists in the improved construction, arrangement, and combination of parts, which will be hereinafter described, and particularly pointed out in the claims.

In the drawings hereto annexed, Figure 1 is a perspective view of a cistern-cleaning apparatus embodying our invention with parts broken away. Fig. 2 is a vertical sectional view of the same. Fig. 3 is a horizontal sectional view. Fig. 4 is a detail vertical sectional view showing the locking device. Fig. 5 is a detail top view of the operating-handle of the cylinder.

Like numerals of reference indicate like parts.

1 designates the bottom plate, which is provided at its outer edge with an annular downwardly-extending flange 2, forming a shoulder or rabbet 3. Said bottom plate is also provided with a central opening 4, from which an annular flange 5 extends upwardly, as shown.

6 designates a yoke or bail, which is secured to diametrically-opposite sides of the bottom plate and is provided with downwardly-extending legs 7. The upper end of the said yoke or bail is provided with a socket 8, in which a handle 9 is secured.

10 is a cylindrical casing, which is open at its lower end and adapted to fit the shoulder or rabbet 3 of the bottom plate 1. The upper end of said cylindrical casing is provided with a head 11, provided on diametrically-opposite sides with perforated lugs 12, engaging the opposite sides of the yoke or bail 6, upon which the said cylindrical casing is thus adapted to slide. The head 11 of the casing 10 is provided with a swiveled handle 13, which is provided on opposite sides with arms 14, to which are pivoted levers 15, the outer ends of which are guided through perforations 16 in the lugs 12 and adapted to engage recesses 17 in the opposite arms of the bail for the purpose of retaining the casing in position for operation.

18 designates a vertical rod, which is guided through perforations 20 and 19, formed, respectively, in the bottom plate 1 and in the top plate 11 of the cylindrical casing. The perforation 20 forms a seat for a valve 21 at the upper end of the rod 18, and the lower end of the said rod is extended downwardly below the bottom plate 1 and provided with a foot 22. The rod 18 carries within the cylindrical casing a valve-plate 23, adapted to fit the upper edge of the annular flange 5 of the bottom plate, which is ground so as to form a seat for the said valve-plate.

The handle 9 of the device is formed of two separate parts connected by a hinged joint 24, and one of said parts is provided with a sliding sleeve 25, which may be adjusted over the said joint, so as to make the handle rigid when desired.

In operation the cylindrical casing is lowered until it engages the shoulder or rabbet 3 of the bottom plate, and it is secured in this position by means of the arms or levers 15 engaging the recesses or perforations 17 in the arms of the yoke or bail. When the cylindrical casing is in this position and is held suspended vertically by the handle, the valve-rod 18 will drop by gravity until the valves 23 and 21 engage the seats 5 and 20, respectively. The upper valve 21 is adjustable upon the upper end of the valve-rod, which is screw-threaded, as shown, and provided with clamping-nuts 27 for this purpose. The said valves will thus close the cylinder in a practically air-tight manner, and the foot 22 at the lower end of the valve-rod will project below the feet 7 at the lower ends of the arms of the yoke or bail. The device is now lowered by means of the handle 9 into the cistern. When the bottom is reached, the foot 22 on striking the bottom will be forced with the valve-rod 18 and the valves in an upward direction, thus causing the water and accumulated filth at the bottom of the cistern to rush into the casing 10, while the air confined in the latter escapes through the opening 20 and upwardly through the water in the cistern, which is thus aerated and purified. The device is now hoisted out of the cistern, and the contents of the casing 10 is discharged by raising the latter upon the yoke or bail, after which the operation may be repeated.

The feet 7, extending downwardly below the bottom plate, will prevent the latter from coming in contact with the bottom of the cistern and thus interfering with the successful operation of the device.

By means of the jointed handle the device may be successfully used for cleaning cisterns located in places not otherwise easily accessible.

Having thus described our invention, what we claim is—

1. In a device for cleaning cisterns, the combination of a yoke or bail, a bottom plate mounted permanently near the lower end of the same and having a central opening, a cylindrical casing mounted to slide upon the said yoke or bail and having an open lower end adapted to engage the bottom plate and provided with an opening in its upper end or head, a valve-rod extending vertically through the cylindrical casing and bottom plate and having valves adapted to close the openings in the head of said cylinder and in the bottom plate, and a handle attached to the yoke or bail, substantially as set forth.

2. In a device for cleaning cisterns, the combination of a cylindrical casing having a valve-opening in its head or top plate and mounted to slide upon a suitable yoke or bail, a bottom plate secured near the lower end of said yoke, having a valve-opening and adapted to close the lower end of the casing, means for securing the cylindrical casing, when in engagement with the bottom plate, to the yoke or bail, and a vertically-sliding valve-rod extending below the bottom plate and having valves adapted to close the openings in the said bottom plate and in the head of the cylindrical casing, substantially as set forth.

3. In a device for cleaning cisterns, the combination of the cylindrical casing mounted slidingly upon a suitable yoke or bail and having a valve-opening in its head or top plate, a bottom plate secured near the lower end of said yoke, and having a valve-opening and an annular shoulder or rabbet engaging the lower end of the cylinder, feet extending downward below said bottom plate, valves arranged to close the openings in the bottom plate and in the top of the cylinder, and means for operating said valves, substantially as set forth.

4. In a device for cleaning cisterns, the combination of the cylindrical casing having an air-exit in its upper end, the bottom plate having the inlet or opening surrounded by an upwardly-extending annular tapering flange, a vertically-sliding valve-rod having valves adapted to close the inlet-opening in the bottom plate, an air-exit in the top of the cylinder, and a handle by which the device may be manipulated independently of the valve-rod, substantially as set forth.

5. The combination of the yoke or bail having the bottom plate, the cylindrical casing mounted to slide upon said yoke by means of perforated lugs or ears, a handle swiveled centrally upon the top plate of the cylinder and having arms extending in opposite directions, and rods or levers connected pivotally with said arms extended through perforations in the lugs at opposite sides of the cylinder-head and adapted to engage recesses or perforations in the yoke or bail, substantially as set forth.

6. The combination, with the bottom plate having the inlet-opening and the cylindrical casing, the two being separably connected, of a vertically-sliding valve-rod having valves adapted to close the inlet-opening in the bottom plate, below which said valve-rod extends, an air-exit in the top of the cylinder, and a handle for manipulating the device independently of the valve-rod, substantially as set forth.

7. The combination, with the cistern-cleaning device comprising the bottom plate having the inlet-opening, the yoke or bail attached to said bottom plate, the cylindrical casing mounted slidingly upon said yoke and having the vertically-sliding valve-rod provided with valves to close the inlet-opening in the bottom plate, and an air-exit in the top of the cylinder, of a jointed handle mounted in a socket at the upper end of the yoke or bail and having a sliding sleeve, substantially as and for the purpose set forth.

In testimony that we claim the foregoing as our own we have hereto affixed our signatures in presence of two witnesses.

ORREN I. SEARLES.
GEO. F. JACKSON.
FRANK M. GUSTIN.

Witnesses:
 FLORENCE BERSTLER,
 JULIUS A. BLIESENER.